(12) United States Patent
Gurak et al.

(10) Patent No.: US 9,341,466 B1
(45) Date of Patent: May 17, 2016

(54) SHEET HEIGHT SENSOR USING MOVABLE AND STATIONARY MIRRORS (71) Applicant: Xerox Corporation, Norwalk, CT (US)

(72) Inventors: David M. Gurak, Webster, NY (US); Timothy J. Clark, Weedsport, NY (US); Bruce H. Smith, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/560,430

(22) Filed: Dec. 4, 2014

(51) Int. Cl.
*G01B 11/06* (2006.01)
*B41J 13/00* (2006.01)
*B41J 11/00* (2006.01)
*G01B 11/02* (2006.01)
*G01B 11/00* (2006.01)

(52) U.S. Cl.
CPC ........... *G01B 11/0691* (2013.01); *B41J 11/003* (2013.01); *B41J 11/0035* (2013.01); *B41J 11/0085* (2013.01); *B41J 13/0009* (2013.01); *B41J 13/0063* (2013.01); *G01B 11/00* (2013.01); *G01B 11/02* (2013.01); *G01B 11/06* (2013.01)

(58) Field of Classification Search
CPC .... G01B 11/0691; G01B 11/06; G01B 11/02; G01B 11/00; B41J 11/003; B41J 11/0035; B41J 13/0063
See application file for complete search history.

(56) References Cited

U.S. PATENT DOCUMENTS

| 3,943,361 | A | * | 3/1976 | Miller ........................... 250/236 |
| 4,926,358 | A | | 5/1990 | Tani et al. |
| 4,996,440 | A | * | 2/1991 | Nordbryhn .............. 250/559.24 |
| 5,070,237 | A | * | 12/1991 | Okuyama et al. ........ 250/227.31 |
| 5,139,339 | A | | 8/1992 | Courtney et al. |
| 5,220,536 | A | * | 6/1993 | Stringer et al. .................. 367/99 |
| 5,422,861 | A | * | 6/1995 | Stringer et al. .................. 367/99 |
| 5,606,534 | A | | 2/1997 | Stringer et al. |
| 5,636,028 | A | * | 6/1997 | Stringer et al. ............... 356/627 |
| 5,659,838 | A | | 8/1997 | Ando et al. |
| 5,699,161 | A | * | 12/1997 | Woodworth .................. 356/628 |
| 5,770,864 | A | | 6/1998 | Dlugos |
| 5,934,140 | A | | 8/1999 | Jackson et al. |
| 5,962,861 | A | | 10/1999 | Fowler |
| 6,100,986 | A | * | 8/2000 | Rydningen .................... 356/630 |
| 6,177,999 | B1 | | 1/2001 | Wurz et al. |
| 6,259,888 | B1 | | 7/2001 | Kazama et al. |
| 6,668,155 | B1 | | 12/2003 | Hubble, III et al. |
| 6,881,972 | B2 | | 4/2005 | Butikofer et al. |
| 7,205,529 | B2 | | 4/2007 | Anderson et al. |
| 2002/0082802 | A1 | * | 6/2002 | Stringer et al. ............... 702/159 |
| 2008/0019751 | A1 | | 1/2008 | Castillo et al. |
| 2011/0272563 | A1 | * | 11/2011 | Ogaki et al. .................. 250/221 |
| 2012/0075620 | A1 | * | 3/2012 | Juni ................................ 356/72 |
| 2013/0264770 | A1 | * | 10/2013 | Zheng et al. ............. 271/265.01 |

* cited by examiner

Primary Examiner — Justin Seo
(74) Attorney, Agent, or Firm — Gibb & Riley, LLC (57) ABSTRACT Apparatuses include a conveyor moving in a processing direction, a print head positioned adjacent the conveyor, a light source positioned adjacent a first side of the conveyor, a movable mirror positioned adjacent a second side of the conveyor, that is across the conveyor from the first side of the conveyor, a fixed mirror positioned adjacent the first side of the conveyor (the fixed mirror is between the light source and the print head), and a light sensor position adjacent the second side of the conveyor. The light sensor is between the movable mirror and the print head. The light source outputs light to the movable mirror across the conveyor, the movable mirror directs the light back across the conveyor to the fixed mirror, and the fixed mirror directs the light again across the conveyor to the light sensor.

20 Claims, 7 Drawing Sheets

SHEET HEIGHT SENSOR USING MOVABLE AND STATIONARY MIRRORS

BACKGROUND

Systems and devices herein generally relate to devices that determine the height of items (e.g., sheets of print media) above a conveyor within a printing device, and more particularly to a system that utilizes movable and stationary mirrors in a compact and inexpensive design.

As the quality and speed of printing devices improves, the tolerances within such printing devices decreases. These tighter tolerances can cause problems if the print media being utilized has an inconsistent thickness. Specifically, if a sheet of print media is thicker than the tolerances within the printing device, the print media can jam within the printing device and/or damage the internals of the printing device. Therefore, systems that can determine the height of the print media accurately and inexpensively are highly valued.

SUMMARY

An exemplary apparatus herein includes a conveyor moving in a processing direction, a print head positioned adjacent the conveyor, and a light source positioned adjacent a first side of the conveyor. The first side of the conveyor is parallel to the processing direction. This exemplary apparatus also includes a movable mirror positioned across the conveyor, adjacent a second side of the conveyor. The second side of the conveyor is parallel to the processing direction, and is across the conveyor from the first side of the conveyor in a second direction that is approximately perpendicular to the processing direction.

This apparatus also has a fixed mirror positioned adjacent the first side of the conveyor. The fixed mirror is between the light source and the print head. Further, a light sensor is positioned adjacent the second side of the conveyor. The light sensor is between the movable mirror and the print head. The "processing direction" is a direction that moves items on the conveyor past the light sensor before moving the items past the print head.

The light source outputs light (e.g., a laser beam or other narrow light beam) across the conveyor to the movable mirror, the movable mirror directs the light back across the conveyor to the fixed mirror, and the fixed mirror directs the light again across the conveyor to the light sensor. Further, the light source, the movable mirror, and the fixed mirror are positioned relative to each other to direct the light from the light source, reflected by the movable mirror and the fixed the mirror, to the light sensor in a single plane. This single plane is parallel to the plane formed by the surface of the conveyor that is moving in the processing direction. Further, this single plane forms a height limit above the second plane. The height limit is a limit for items being moved by the conveyor past the print head.

In another example, a device herein can be an inkjet printer that includes a perforated vacuum belt having a surface that moves in a processing direction when the belt moves. An inkjet print head is positioned adjacent the perforated vacuum belt. Also, a light source is positioned adjacent a first side of the perforated vacuum belt.

Further, a movable mirror is positioned adjacent a second side of the perforated vacuum belt. The movable mirror rotates in a plane parallel to the surface of the perforated vacuum belt. The first side and the second side of the perforated vacuum belt are parallel to the processing direction, and the second side of the perforated vacuum belt is across the perforated vacuum belt from the first side of the perforated vacuum belt (in a second direction, where the second direction is approximately perpendicular to the processing direction).

Additionally, a fixed mirror is positioned adjacent the first side of the perforated vacuum belt. More specifically, the fixed mirror is between the light source and the inkjet print head. A light sensor array is positioned adjacent the second side of the perforated vacuum belt, the light sensor array is between the movable mirror and the inkjet print head. Also, the processing direction moves sheets of print media in a direction on the perforated vacuum belt past the light sensor array before moving the sheets of print media past the inkjet print head.

The light source outputs light (e.g., a laser beam or other narrow light beam) across the perforated vacuum belt to the movable mirror. In turn, the movable mirror directs the light back across the perforated vacuum belt to the fixed mirror, and the fixed mirror directs the light again across the perforated vacuum belt to the light sensor array. Further, the light source, the movable mirror, and the fixed mirror are positioned relative to each other to direct the light from the light source, reflected by the movable mirror and the fixed the mirror, to the light sensor array in a single plane. This single plane is parallel to a plane formed by the surface of the perforated vacuum belt. Also, this single plane establishes a height limit above the surface of the perforated vacuum belt (e.g., above the second plane in a third direction that intersects the surface of the perforated vacuum belt and the second plane). This height limit is a limit for sheets of print media being moved by the perforated vacuum belt past the inkjet print head.

These and other features are described in, or are apparent from, the following detailed description.

BRIEF DESCRIPTION OF THE DRAWINGS

Various exemplary systems and devices are described in detail below, with reference to the attached drawing Figures, in which.

DETAILED DESCRIPTION

As mentioned above, systems that can determine the height or thickness of the print media within a printer accurately and inexpensively are highly valued. Many devices that determine the height of the print media above the conveyor belt utilize light or sonic sensors that direct light or sound energy perpendicularly toward the surface of the conveyor belt. Such systems base the determination of the media thickness on the reflection of the sound or light energy from the conveyor belt and the print media surfaces. However, such systems are inconvenient because they require a large amount of space above the conveyor belt and therefore consume a lot of vertical space within the printing device unnecessarily.

Further, because such systems rely primarily upon reflection for a height determination, their accuracy is fundamentally limited by this methodology. In addition, such systems that rely upon reflection for height or thickness determination may only look at one portion of the sheet of print media at one time (e.g., along the centerline of the print media). The systems described herein overcome these limitations by utilizing an extremely low profile detection system that is positioned and operates parallel to the surface of the conveyor belt and that has increased height accuracy.

More specifically, the devices described herein output a light beam in a direction parallel to the surface of the conveyor belt and reflect the light beam back and forth across the conveyor belt and number of times using mirrors before allowing the light beam to reach a light sensor. This allows the height (thickness) of multiple portions of the sheet of print media to be repeatedly checked at many different transport locations as the sheet is fed in the process direction.

Further, the path of the light beam is maintained parallel to the surface of the conveyor belt, which allows the height detection capability of the system to be substantially accurate (for a given height limit being used). Also, the components of the device described herein are substantially outside the paper path and are positioned generally parallel to the surface of the conveyor belt, which is a region that usually has additional space that is not being utilized by other components. Therefore, these systems are not only extremely compact from a height standpoint within the printer (where "height" is a direction perpendicular to, and intersecting, the conveyor belt) they also utilize spaces lateral to the conveyor belt within the printer that can generally accommodate additional components. Therefore, the devices described herein can be utilized within existing printing devices without substantial modification, and these devices allow newly design printing devices to be smaller and more compact, which makes them easier to use, increases uses satisfaction, decreases material usage and waste, etc.

An exemplary height sensor device 120 herein shown in FIGS. 1-8 can be used with a device having a conveyor 100 moving in a processing direction, and a print head 104 positioned adjacent the conveyor 100.

The height sensor device 120 includes a light source 110 positioned adjacent a first side of the conveyor 100. The first side of the conveyor 100 is parallel to the processing direction. This exemplary apparatus 120 also includes a movable mirror 112 positioned across the conveyor 100, adjacent a second side of the conveyor 100. The second side of the conveyor 100 is parallel to the processing direction, and is across the conveyor 100 from the first side of the conveyor 100 (in a second direction that is approximately perpendicular to the processing direction, and parallel to the surface of the conveyor 100).

This apparatus 120 also has a fixed mirror positioned adjacent the first side of the conveyor 100. The fixed mirror is between the light source 110 and the print head 104. Further, a light sensor 116 is positioned adjacent the second side of the conveyor 100. The light sensor 116 is between the movable mirror 112 and the print head 104.

The light source 110 outputs light (e.g., a laser beam or other narrow, focused light beam) across the conveyor 100 to the movable mirror 112. The movable mirror 112 moves or oscillates to direct the light back across the conveyor 100 to many points on the fixed mirror at different points in time. The fixed mirror directs the light again across the conveyor 100 to multiple points on the light sensor 116 at different points in time. Further, the light source 110, the movable mirror 112, and the fixed mirror are positioned relative to each other to direct the light from the light source 110, reflected by the movable mirror 112 and the fixed the mirror, to the light sensor 116 in a single plane. This single plane is parallel to the plane formed by the surface of the conveyor 100 that is moving in the processing direction.

Further, this single plane forms a height limit above the second plane. The height limit is from the conveyor 100 in a third direction that is perpendicular to the conveyor 100 and the second plane, and the third direction intersects the surface of the conveyor 100 and is from the conveyor 100 toward the print head 104). The height limit is a limit for items 102 being moved by the conveyor 100 past the print head 104. Therefore, any of the items 102 that are above this single plane will block the light beam at certain times, preventing the light beam from reaching the light sensor 116 at certain times. When the light sensor 116 does not receive the beam of light which it expects to receive, this indicates that the paper exceeds the height limit, and processing does not allow the paper to be fed under to print heads 104, which prevents paper jams and keeps the print heads 104 from being damaged.

Figure 1:
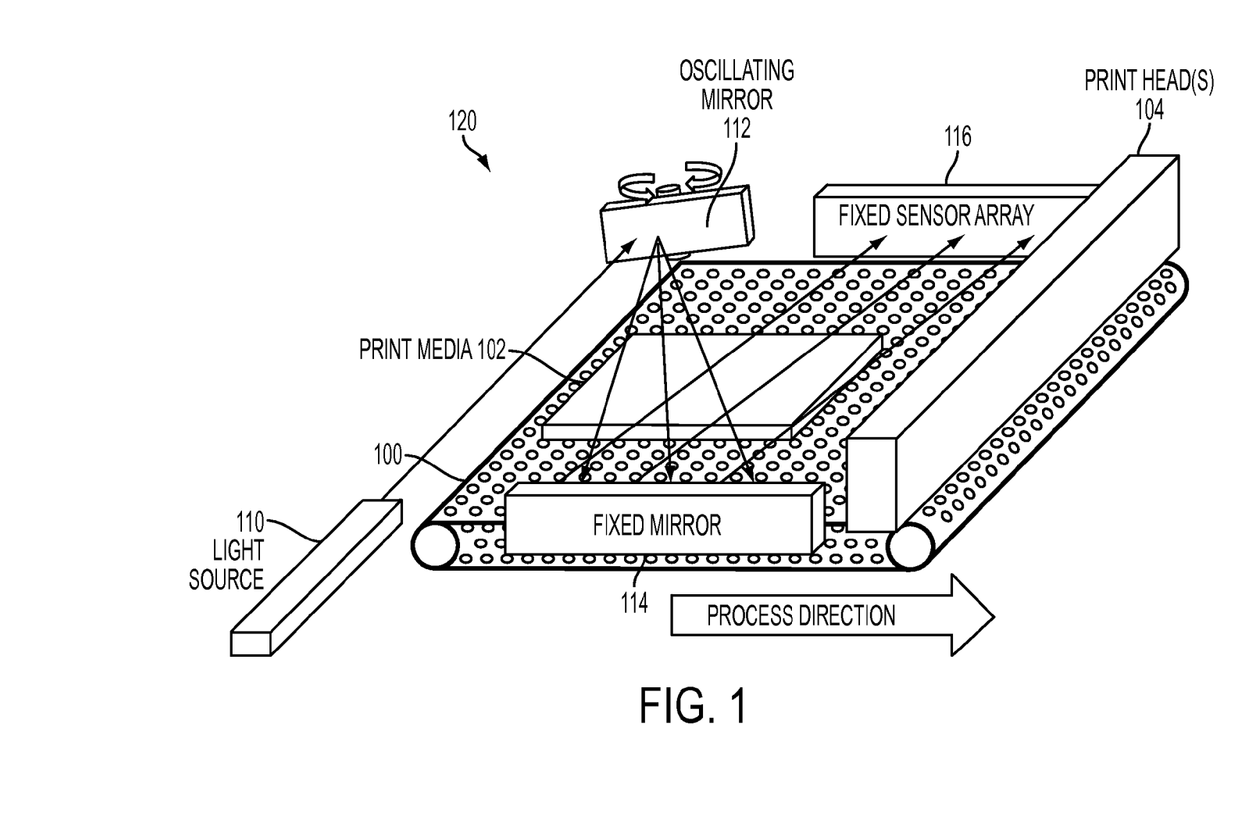
FIG. 1 is a perspective schematic diagram illustrating devices herein.
Figure 2:
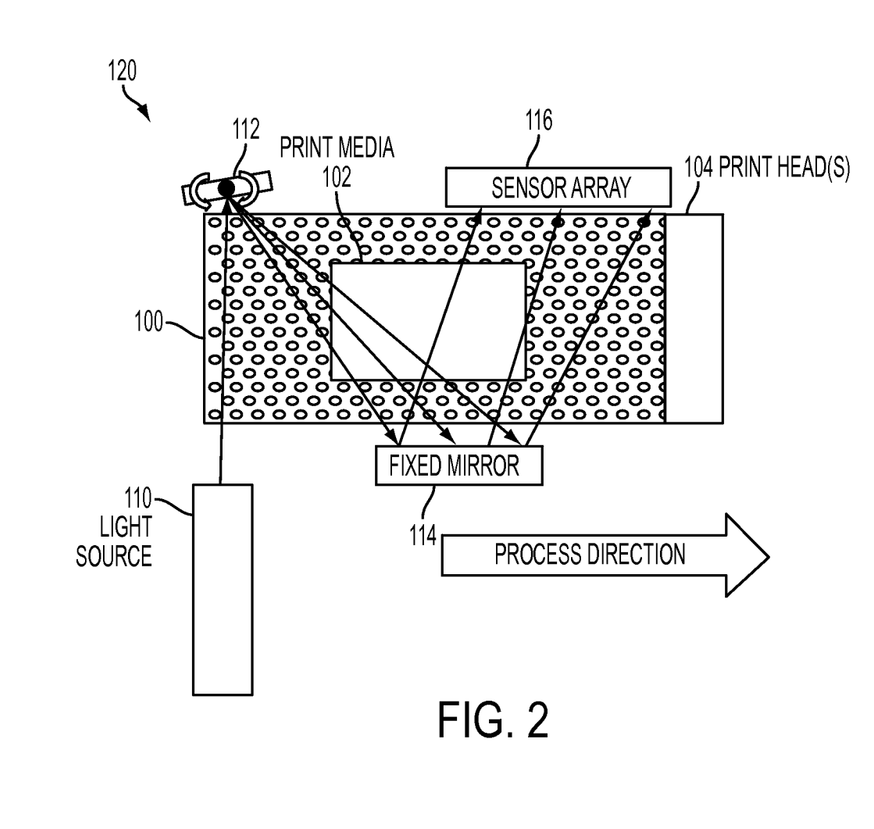
FIG. 2 is a top-view schematic diagram illustrating devices herein.

In a more specific example, which is also shown in FIGS. 1-8, a device herein can be a printer that includes a perforated vacuum belt 100 (or any other type of conveyor) having a surface that moves in a processing direction when the belt moves (indicated by arrows in FIGS. 1 and 2). The perforated vacuum belt 100 is only one example, and item 100 is also intended to illustrate standard flat conveyors and/or rollers; however, the perforated vacuum belt 100 helps hold the sheets of print media 102 against the belt, reducing the likelihood of contact with the print head(s) 104. The details of vacuum belt systems are well-known to those skilled in the art and are not shown in the drawings to avoid clutter and to allow the salient features of the devices herein to be more clearly seen. An inkjet print head assembly (or any other type of print device assembly) 104 (which can contain one or many print heads) is positioned adjacent the perforated vacuum belt 100.

The first side and the second side of the belt 100 are parallel to the processing direction, and the second side of the belt 100 is across the belt 100 from the first side of the belt 100 (across the belt being in a second direction, where the second direction is approximately perpendicular to the processing direction). Therefore, for example, the processing direction moves sheets of print media 102 on the belt 100 past the light sensor 116 array before moving the sheets of print media past the inkjet print head 104, and the second direction is parallel to the surface of such sheets of print media 102, but is perpendicular to the processing direction.

With the height sensors 120 herein, a light source 110 is positioned adjacent the first side of the belt 100. The light source 110 can be any light source that can produce a narrow, focused beam of light, such as a focused incandescent light, led lights, laser light source, etc., or any other focused light currently known or that may be developed in the future, that may or may not use focusing lenses, fiber-optic filters, etc.

Further, in the height sensor 120 a movable mirror 112 is positioned adjacent the second side of the belt 100. As shown by the curved arrow surround item 112 in FIGS. 1 and 2, the movable mirror 112 rotates in a plane parallel to the surface of the belt 100. The movable mirror 112 can be driven by any form of motor source, such as an oscillator, actuator, etc. (directly or indirectly) and item 112 also generically illustrates that motor source or actuator. The motor that moves the mirror 112 does so in a predictable regular pattern (as controlled by the controller discussed below) back and forth in an oscillating manner to produce a predictable regular pattern of moving light beam striking different locations of the fixed sensor array 116. Any disruption to the expected light beam pattern striking the fixed sensor array 116 is interpreted by the controller (discussed below) to indicate that there is an item that exceeds a height limit blocking the light beam (and that the sheet of print media should not be allowed to be processed through the print heads 104).

Additionally, in the height sensor 120 a fixed mirror (e.g., a mirror that does not move or rotate) is positioned adjacent the first side of the belt 100. More specifically, the fixed mirror is positioned along the first side of the belt 100 between the light source 110 and the inkjet print head 104. A light sensor 116 array (of any form, such as a CCD array, etc.) in the height sensor 120 is positioned adjacent the second side of the belt 100. The light sensor 116 array is positioned along the second side of the belt 100 between the movable mirror 112 and the inkjet print head 104.

The light source 110 outputs light (e.g., a laser beam or other narrow, focused light beam) across the belt 100 to the movable mirror 112. In turn, the movable mirror 112 directs the light back across the belt 100 to the fixed mirror, and the fixed mirror directs the light again across the belt 100 to the light sensor 116 array. Therefore, the light beam output by the light source 110 crosses the belt 100 at least twice before reaching the sensor array 116. With a light beam that crosses the process direction multiple times, the devices herein check a greater surface area of the print media sheet 100 and check the height of the print media sheet 100 for a longer travel length in the processing direction when compared to a cross-process direction light beam that only crosses the conveyor a single time (a light beam in the direction perpendicular to the process direction that is not reflected back across the conveyor).

Additionally, as noted above, the rotating mirror 112 oscillates back-and-forth (in a regular pattern) in order to cause the light beam to strike different areas of the fixed mirror 114 at different times (as shown by the diagonal arrows in FIG. 2). More specifically, the rotating mirror and fixed mirror 114 can be flat mirrors. By changing the angle of the rotating mirror 112 relative to the light source 110 and the fixed mirror 114, the location that the light team strikes the fixed mirror 114 changes. This also changes the location of where the light beam strikes the sensor array 116. Therefore, as shown in FIG. 2 the height sensor 120 herein continually changes the angle at which a light beam crosses the belt 100 and the sheet 102, from perpendicular to the process direction (the portion of light beam being output by the light source 110), to many different angles that are not perpendicular to the processed direction (as shown by the diagonal arrows that represent the light beam at different times) to allow the height sensor 120 to repeatedly check many different portions of the print media 102 against the height limit for a longer travel length in the process direction, thereby increasing accuracy.

Additionally, while a non-reflected light beam in the cross-process direction (the light beam exiting the light source 110) will cross all areas of the sheet of print media 102 a single time as the belt 100 moves the sheet of print media 102 past such a light source 110 in the process direction, the additional non-perpendicular light beam angles illustrated by the diagonal arrows in FIG. 2 allow the height of the print media to be rechecked multiple times for a longer travel length in the process direction by the height sensors 120 herein, thereby dramatically increasing accuracy relative to a non-reflected cross-process light beam (without incurring the expense of additional light sources or sensors). The utilization of mirrors by structures herein permits the height of the print media to be repeatedly checked at different points in the process direction, without incurring the additional expense associated with multiple light sources and multiple light sensors.

Figure 3:
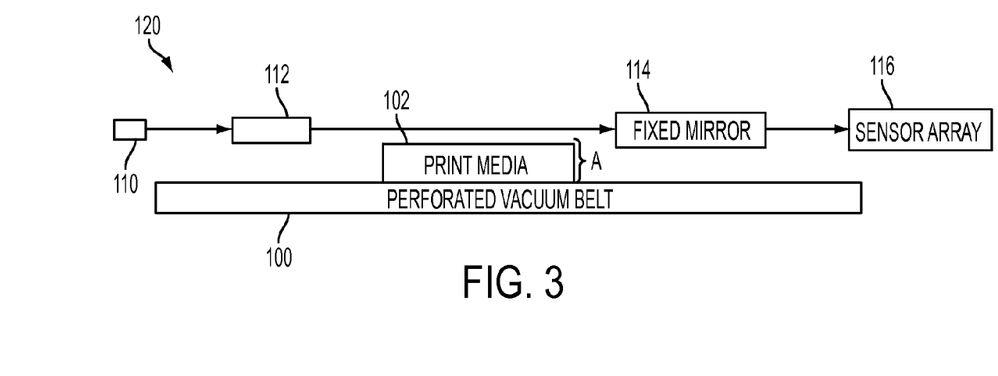
FIG. 3 is a side-view schematic diagram illustrating devices herein.

Further, the light source 110, the movable mirror 112, and the fixed mirror are positioned relative to each other to direct the light from the light source 110, reflected by the movable mirror 112 and the fixed the mirror, to the light sensor 116 array in a single plane, as shown in the cross-sectional view in FIG. 3. As also shown in FIG. 3, this single plane is parallel to a plane formed by the surface of the belt 100.

Further, FIG. 3 illustrates that all components of the height sensor 120 are close to the plane of the belt 100, demonstrating that the height sensor 120 herein is compact vertically (relative to the surface of the belt) within the printing device. FIG. 3 also illustrates that all components of the height sensor 120 can be positioned to not overlap the belt 100 (relative to the surface of the belt) and that such components utilize areas lateral to the paper path for the components, which can be areas that are more available (e.g., unused) in many printer designs. Further, all components of the height sensor 120 can be positioned to not contact the belt 100 or print media 102.

This single plane shown in FIG. 3 establishes a height limit above the surface of the belt 100 e.g., above, meaning a third direction that intersects the surface of the belt 100 and the second plane 104 and is from the belt 100 toward the light sensor 104). This height limit is a limit for sheets of print media 102 being moved by the belt 100 past the inkjet print head 104.

Figure 4:
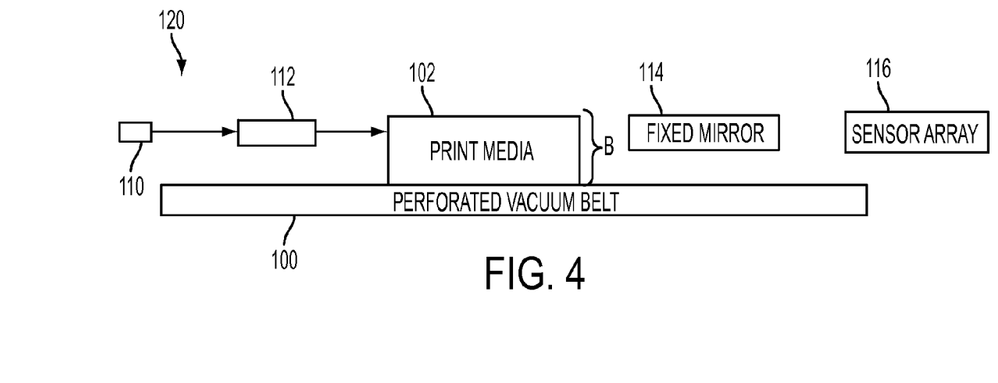
FIG. 4 is a side view schematic diagram illustrating devices herein.
Figure 5:
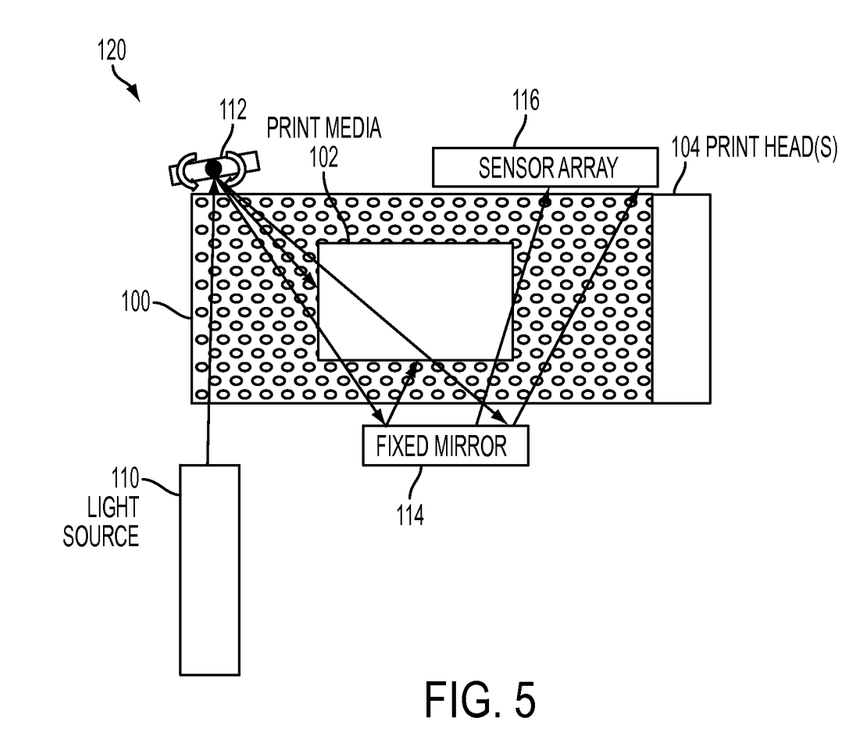
FIG. 5 is a top-view schematic diagram illustrating devices herein.

For example, comparing FIGS. 3 and 4, areas of a sheet of print media that are within the height limit (indicated in FIG. 3 by the height identifier A) allow the light beam to pass to the sensor array 116. To the contrary, as shown in FIG. 4, if one or more portions of the print media 102 exceed the height limit (indicated in FIG. 4 by the height identifier B) at one or more time periods the light beam will strike the print media 102 (be blocked by the print media 102) and will not reach the sensor array 116. This is also shown in FIG. 5 where the light beam is shown as being blocked by the print media 102 at different time periods. As noted above, this disruption to the expected light beam striking the fixed sensor array 116 are interpreted to indicate that there is an item that exceeds a height limit blocking the light beam (and that the sheet print media should not be allowed to be processed through the print heads 104).

Figure 6:
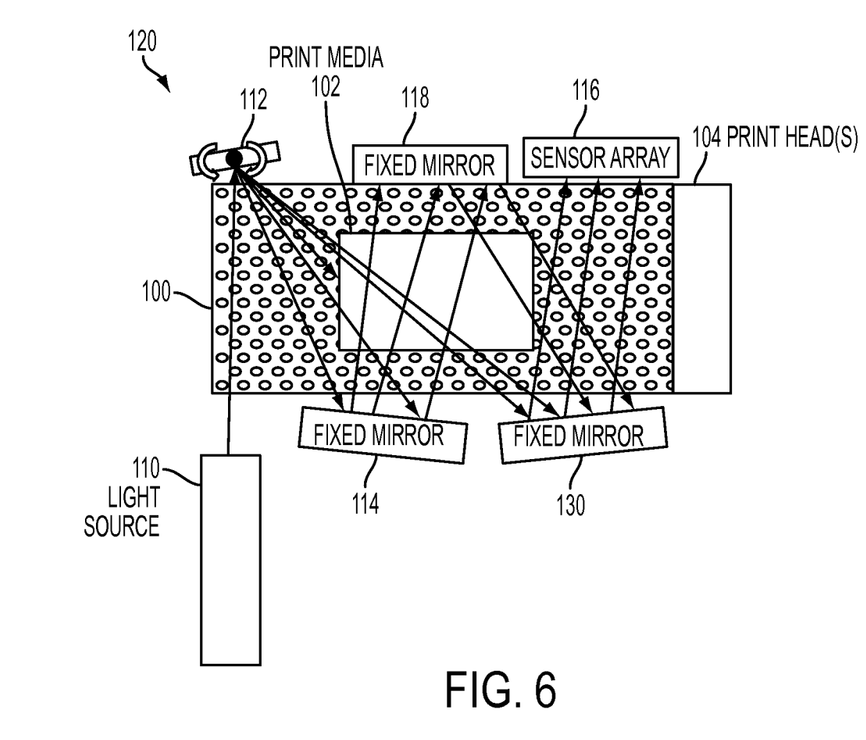
FIG. 6 is a top-view schematic diagram illustrating devices herein.

While the previous explanation discusses a single fixed mirror 114, those ordinarily skilled in the art would understand that multiple fixed mirrors 118, 130 could be utilized on opposite sides of the belt 100, as shown in FIG. 6. Therefore, rather than the light beam crossing the belt 100 three times, as is illustrated in FIG. 2, in FIG. 6 the light beam can cross the belt 100 up to five times, thereby allowing even more complete coverage of the sheet of print media 102. Those ordinarily skilled in the art would understand that additional mirrors could be included within the structures herein, and that the drawings provided herewith only illustrate a limited number of examples of the inventive structure.

Figure 7:
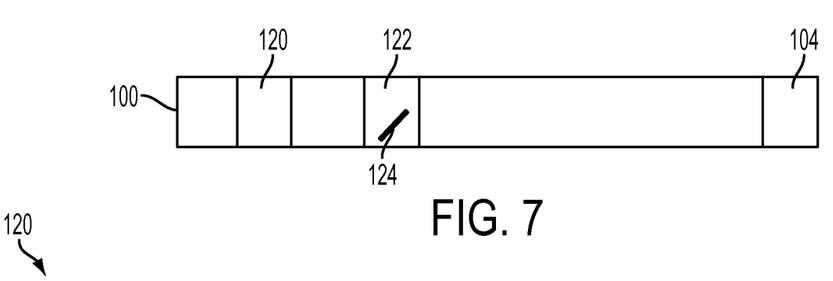
FIG. 7 is a top view schematic diagram illustrating devices herein.

FIG. 7 illustrates one structure that can be utilized to prevent sheets that exceed the height limit from reaching the print heads. More specifically, FIG. 7 illustrates the height checking structures discussed above in FIGS. 1-6 as item 120 and a diverter as item 122. In operation (as controlled by the controller discussed below) as a sheet of print media moves along the belt 100, if the height sensor 120 determines that the sheet of print media is above the height limit, the diverter 122 can include a movable element 124 (e.g., arm, drop shoot, air knife, etc.) that diverts the sheet of print media off the belt 100 (potentially into a recycle bin or other waste device). This prevents any over-height sheets from reaching the print heads 104, preventing paper jams and potential damage to the print heads. Alternatively, the printer can be stopped before the sheet of media 102 reaches the print heads 104 to allow manual removal of the sheet.

Figure 8:
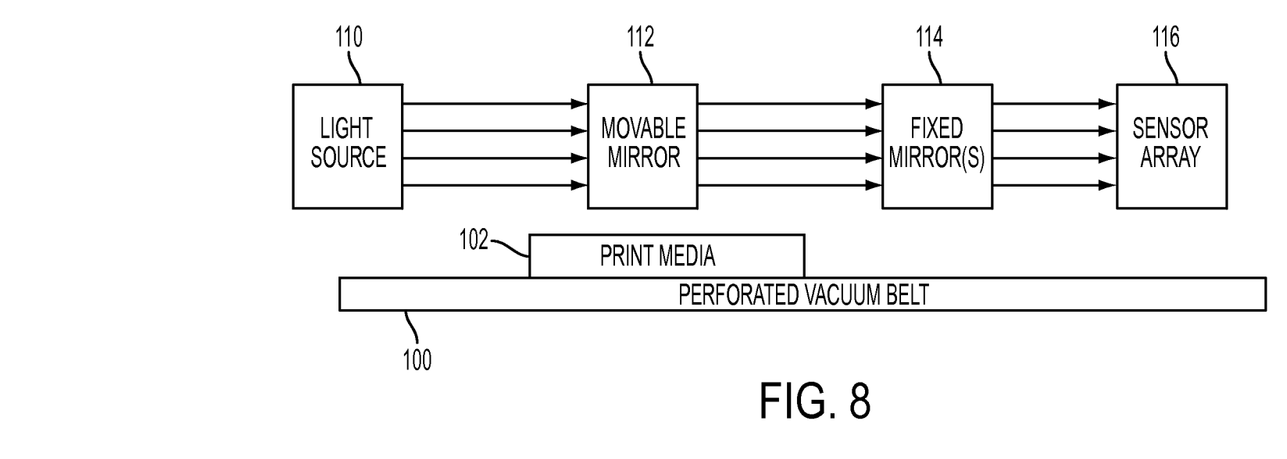
FIG. 8 is a side view schematic diagram illustrating devices herein.

Additionally, while the foregoing explanation discusses a light beam being within a single plane to perform a height check of a single height limit, other structures herein can utilize multiple, parallel light beams to check multiple height limits. More specifically, as shown in FIG. 8, the light source 110 can output multiple light beams along multiple parallel planes (potentially simultaneously, or sequentially) that are all parallel to the plane formed by the surface of the belt 100. These multiple light beams are reflected by the mirrors 112, 114 before reaching the light sensor 116, as discussed above. The processor discussed below can determine which of the light beams were interrupted by the sheet of print media to classify the thickness of the sheet of media within a specific range.

Figure 9:
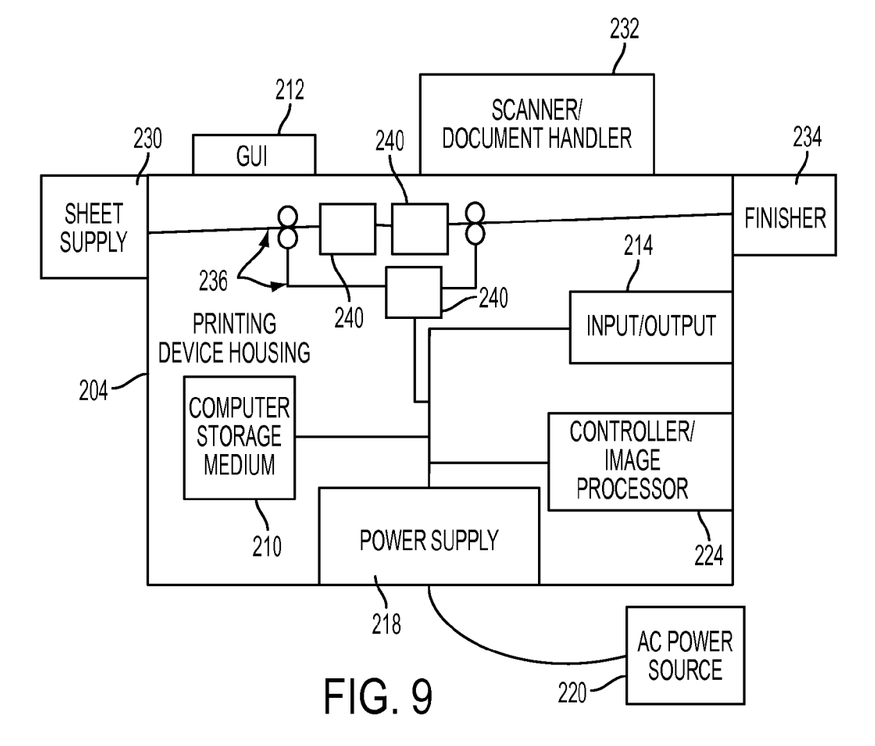
FIG. 9 is a side-view schematic diagram illustrating devices herein.

FIG. 9 illustrates a printing device 204, which can be used with systems and devices herein and can comprise, for example, a printer, copier, multi-function machine, multi-function device (MFD), etc. The printing device 204 includes a controller/tangible processor 216 and a communications port (input/output) 214 operatively connected to the tangible processor 216 and to the computerized network 202 external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc., and the media path includes the sheet height sensor 120 discussed above and shown in FIGS. 1-8. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printing device 204 shown in FIG. 9 is only one example and the systems and devices herein are equally applicable to other types of printing devices that may include fewer components or more components. For example, while a limited number of printing engines and paper paths are illustrated in FIG. 9, those ordinarily skilled in the art would understand that many more paper paths and additional printing engines could be included within any printing device used with systems and devices herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and devices described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and devices herein can encompass systems and devices that print in color, monochrome, or handle color or monochrome image data. All foregoing systems and devices are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and devices herein cannot be implied or imported from any above example as limitations to any particular order, number, position, size, shape, angle, color, or material.

What is claimed is:

1. A printing apparatus comprising:
   a conveyor moving in a processing direction;
   a print head positioned adjacent said conveyor;
   a light source positioned adjacent a first side of said conveyor, said first side of said conveyor being parallel to said processing direction;
   a movable mirror positioned adjacent a second side of said conveyor, said second side of said conveyor being parallel to said processing direction, said second side of said conveyor being across said conveyor from said first side of said conveyor in a second direction, said second direction being approximately perpendicular to said processing direction;
   a fixed mirror positioned adjacent said first side of said conveyor, said fixed mirror being positioned along said first side of said conveyor between said light source and said print head; and
   a light sensor positioned adjacent said second side of said conveyor, said light sensor being positioned along said second side of said conveyor between said movable mirror and said print head,
   said light source outputting light to said movable mirror,
   said movable mirror directing said light to said fixed mirror, and
   said fixed mirror directing said light to said light sensor.

2. The printing apparatus according to claim 1, said light source, said movable mirror, and said fixed mirror being positioned relative to each other to direct said light from said light source, reflected by said movable mirror and said fixed the mirror, to said light sensor in a single plane.

3. The printing apparatus according to claim 2, said single plane being parallel to a second plane formed by a surface of said conveyor that is moving in said processing direction.

4. The printing apparatus according to claim 3, said single plane comprising a height limit above said second plane in a third direction that intersects said surface of said conveyor toward said print head, said height limit being a limit for items being moved by said conveyor past said print head.

5. The printing apparatus according to claim 2, said light source producing a plurality of parallel light beams in different planes parallel to said single plane.

6. The printing apparatus according to claim 1, further comprising a plurality of additional fixed mirrors positioned on opposite sides of said conveyor.

7. The printing apparatus according to claim 1, said processing direction moving items on said conveyor past said light sensor before moving said items past said print head.

8. A printing apparatus comprising:
   a perforated vacuum belt having a surface moving in a processing direction;
   a print head positioned adjacent said perforated vacuum belt;
   a light source positioned adjacent a first side of said perforated vacuum belt, said first side of said perforated vacuum belt being parallel to said processing direction;
   a movable mirror positioned adjacent a second side of said perforated vacuum belt, said movable mirror rotating in a plane parallel to said surface of said perforated vacuum belt, said second side of said perforated vacuum belt being parallel to said processing direction, said second side of said perforated vacuum belt being across said perforated vacuum belt from said first side of said perforated vacuum belt in a second direction, said second direction being approximately perpendicular to said processing direction;
   a fixed mirror positioned adjacent said first side of said perforated vacuum belt, said fixed mirror being positioned along said first side of said perforated vacuum between said light source and said print head; and
   a light sensor array positioned adjacent said second side of said perforated vacuum belt, said light sensor array being positioned along said second side of said perforated vacuum between said movable mirror and said print head,
   said light source outputting light to said movable mirror,
   said movable mirror directing said light to said fixed mirror, and
   said fixed mirror directing said light to said light sensor array.

9. The printing apparatus according to claim 8, said light source, said movable mirror, and said fixed mirror being positioned relative to each other to direct said light from said light source, reflected by said movable mirror and said fixed the mirror, to said light sensor array in a single plane.

10. The printing apparatus according to claim 9, said single plane being parallel to a second plane formed by said surface of said perforated vacuum belt.

11. The printing apparatus according to claim 10, said single plane comprising a height limit above said second plane in a third direction that intersects said surface of said perforated vacuum belt toward said print head, said height limit being a limit for items being moved by said perforated vacuum belt past said print head.

12. The printing apparatus according to claim 9, said light source producing a plurality of parallel light beams in different planes parallel to said single plane.

13. The printing apparatus according to claim 8, further comprising a plurality of additional fixed mirrors positioned on opposite sides of said perforated vacuum belt.

14. The printing apparatus according to claim 8, said processing direction moving items on said perforated vacuum belt past said light sensor before moving said items past said print head.

15. An inkjet printer comprising:
   a perforated vacuum belt having a surface moving in a processing direction;
   an inkjet print head positioned adjacent said perforated vacuum belt;
   a light source positioned adjacent a first side of said perforated vacuum belt, said first side of said perforated vacuum belt being parallel to said processing direction;
   a movable mirror positioned adjacent a second side of said perforated vacuum belt, said movable mirror rotating in a plane parallel to said surface of said perforated vacuum belt, said second side of said perforated vacuum belt being parallel to said processing direction, said second side of said perforated vacuum belt being across said perforated vacuum belt from said first side of said perforated vacuum belt in a second direction, said second direction being approximately perpendicular to said processing direction;

a fixed mirror positioned adjacent said first side of said perforated vacuum belt, said fixed mirror being positioned along said first side of said perforated vacuum between said light source and said inkjet print head; and a light sensor array positioned adjacent said second side of said perforated vacuum belt, said light sensor array being positioned along said second side of said perforated vacuum between said movable mirror and said inkjet print head, said light source outputting light to said movable mirror, said movable mirror directing said light to said fixed mirror, and said fixed mirror directing said light to said light sensor array.

16. The inkjet printer according to claim 15, said light source, said movable mirror, and said fixed mirror being positioned relative to each other to direct said light from said light source, reflected by said movable mirror and said fixed the mirror, to said light sensor array in a single plane.

17. The inkjet printer according to claim 16, said single plane being parallel to a second plane formed by said surface of said perforated vacuum belt.

18. The inkjet printer according to claim 17, said single plane comprising a height limit above said second plane in a third direction that intersects said surface of said perforated vacuum belt and said second plane, said height limit being a limit for sheets of print media being moved by said perforated vacuum belt past said inkjet print head.

19. The inkjet printer according to claim 16, said light source producing a plurality of parallel light beams in different planes parallel to said single plane.

20. The inkjet printer according to claim 15, further comprising a plurality of additional fixed mirrors positioned on opposite sides of said perforated vacuum belt.

* * * * *